US012687458B2

(12) United States Patent
McClean et al.

(10) Patent No.: US 12,687,458 B2
(45) Date of Patent: Jul. 21, 2026

(54) PLUGGABLE OPTICAL TIME DOMAIN REFLECTOMETER

(71) Applicant: II-VI Delaware, Inc., Wilmington, DE (US)

(72) Inventors: Ian Peter McClean, Brixham (GB); Siegfried Fleischer, Los Gatos, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 17/895,339

(22) Filed: Aug. 25, 2022

(65) Prior Publication Data

US 2024/0068905 A1      Feb. 29, 2024

(51) Int. Cl.
G01M 11/00 (2006.01)

(52) U.S. Cl.
CPC .... G01M 11/3145 (2013.01); G01M 11/3154 (2013.01)

(58) Field of Classification Search
CPC ............. G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; H04B 10/071
See application file for complete search history.

(56) References Cited

U.S. PATENT DOCUMENTS

| | | | | |
|---|---|---|---|---|
| 5,793,909 | A | 8/1998 | Leone et al. | |
| 5,963,313 | A * | 10/1999 | Anderson | .......... G01M 11/3145 |
| | | | | 356/73.1 |
| 6,141,089 | A * | 10/2000 | Thoma | ................ G02B 6/4215 |
| | | | | 356/73.1 |
| 7,031,574 | B2 * | 4/2006 | Huang | ................ G02B 6/2746 |
| | | | | 385/39 |

(Continued)

FOREIGN PATENT DOCUMENTS

| | | | | |
|---|---|---|---|---|
| CN | | 102104423 | A * | 6/2011 |
| CN | | 102761367 | A * | 10/2012 |

(Continued)

OTHER PUBLICATIONS

T. Mauldin, Z. Xu and T. Wei, "Software defined optical time-domain reflectometer," 2022 IEEE 30th Annual International Symposium on Field-Programmable Custom Computing Machines (FCCM), New York City, NY, USA, 2022, pp. 1-5, doi: 10.1109/FCCM53951. 2022.9786161. (Year: 2022).*

(Continued)

*Primary Examiner* — Gordon J Stock, Jr.
(74) *Attorney, Agent, or Firm* — McAndrews, Held & Mallloy, Ltd.

(57) ABSTRACT

A pluggable OTDR is disclosed that is utilizes a specific architecture that separates its passive optical elements from the remaining active optical and electrical elements. The set of active elements (i.e., laser, photodetector, and control/processing electronics) can arranged in a manner similar to a small form-factor pluggable (SFP) optical transceiver and (Continued)

assembled within a housing that meets these requirements. The passive optics may be incorporated into a separate optical fiber pigtailed component that is attached between the active OTDR module and a fiber span under test.

20 Claims, 5 Drawing Sheets

(56) References Cited

U.S. PATENT DOCUMENTS

| | | | | |
|---|---|---|---|---|
| 8,867,924 | B2 * | 10/2014 | Mariotti | H04B 10/40 |
| | | | | 398/140 |
| 8,879,918 | B1 | 11/2014 | Wang et al. | |
| 9,036,991 | B2 * | 5/2015 | Aguren | H04B 10/071 |
| | | | | 398/21 |
| 9,143,236 | B1 * | 9/2015 | Bartur | G01M 11/3145 |
| 9,287,989 | B2 * | 3/2016 | Straub | H04B 10/079 |
| 9,429,496 | B2 * | 8/2016 | Kuznia | G01M 11/3154 |
| 10,110,302 | B2 * | 10/2018 | Mansouri Rad | G01M 11/3136 |
| 10,656,343 | B1 * | 5/2020 | Applebaum | G02B 6/4284 |
| 10,914,655 | B2 * | 2/2021 | Roux | G01M 11/3145 |
| 10,944,472 | B2 * | 3/2021 | Manning | G01M 11/3154 |
| 11,159,231 | B2 * | 10/2021 | Menard | H04J 14/0275 |
| 11,258,509 | B2 * | 2/2022 | Chedore | H04Q 11/0001 |
| 11,366,039 | B2 * | 6/2022 | Kuznia | G01M 11/3154 |
| 11,703,397 | B2 * | 7/2023 | Champavere | G01K 11/32 |
| | | | | 376/161 |
| 11,784,712 | B2 * | 10/2023 | Vaez-Ghaemi | G02B 6/4277 |
| | | | | 398/115 |
| 2006/0153570 | A1 * | 7/2006 | Nelson | H04B 10/504 |
| | | | | 398/135 |
| 2006/0198639 | A1 * | 9/2006 | Giaretta | G02B 6/4246 |
| | | | | 398/135 |
| 2006/0215545 | A1 * | 9/2006 | Nelson | H04B 10/0799 |
| | | | | 370/216 |
| 2007/0147844 | A1 * | 6/2007 | Harres | H04L 5/14 |
| | | | | 398/135 |
| 2008/0031634 | A1 * | 2/2008 | Nguyen | H04B 10/504 |
| | | | | 398/160 |
| 2008/0101752 | A1 * | 5/2008 | Chan | G02B 6/4214 |
| | | | | 385/89 |
| 2008/0298815 | A1 * | 12/2008 | Khalouf | H04H 20/69 |
| | | | | 398/202 |
| 2009/0268197 | A1 * | 10/2009 | Perron | G01M 11/3136 |
| | | | | 356/73.1 |
| 2010/0135620 | A1 | 6/2010 | Chou | |
| 2012/0182900 | A1 * | 7/2012 | Davari | H04L 43/062 |
| | | | | 370/254 |
| 2012/0301151 | A1 * | 11/2012 | Hu | H04B 10/40 |
| | | | | 315/117 |

| | | | | |
|---|---|---|---|---|
| 2013/0272694 | A1 * | 10/2013 | Sandstrom | H04Q 11/0067 |
| | | | | 398/21 |
| 2015/0253217 | A1 * | 9/2015 | Gurusami | H01S 3/094076 |
| | | | | 356/73.1 |
| 2019/0372197 | A1 * | 12/2019 | Iwasaki | H01Q 1/2291 |
| 2023/0236086 | A1 * | 7/2023 | Pei | G01M 11/319 |
| | | | | 702/189 |
| 2023/0275657 | A1 * | 8/2023 | Zhang | H04B 10/2575 |
| | | | | 398/21 |
| 2024/0248000 | A1 * | 7/2024 | Fleischer | G01M 11/3154 |
| 2024/0248002 | A1 * | 7/2024 | Lv | G02B 6/002 |
| 2024/0364419 | A1 * | 10/2024 | Wei | H04B 10/503 |
| 2024/0369446 | A1 * | 11/2024 | Magri | G01M 11/3118 |
| 2024/0385079 | A1 * | 11/2024 | McClean | G01M 11/3154 |
| 2025/0211328 | A1 * | 6/2025 | McClean | H04B 10/071 |

FOREIGN PATENT DOCUMENTS

| | | | | | |
|---|---|---|---|---|---|
| CN | 102820921 | A | * | 12/2012 | |
| CN | 102998755 | A | * | 3/2013 | |
| CN | 104508977 | A | * | 4/2015 | H03F 3/087 |
| CN | 103036615 | B | * | 10/2015 | |
| CN | 102957977 | B | * | 11/2015 | |
| CN | 105703824 | A | * | 6/2016 | |
| CN | 106353865 | A | * | 1/2017 | G02B 6/4246 |
| CN | 104717006 | B | * | 3/2018 | |
| CN | 110794528 | A | * | 2/2020 | G02B 6/4245 |
| CN | 112054839 | A | * | 12/2020 | H04B 10/071 |
| EP | 3764566 | A1 | * | 1/2021 | G01M 11/3127 |
| WO | WO-2007002815 | A2 | * | 1/2007 | H01S 5/02325 |
| WO | WO-2013143055 | A1 | * | 10/2013 | H01S 5/02453 |
| WO | WO-2014094255 | A1 | * | 6/2014 | H04B 10/071 |
| WO | WO-2022053133 | A1 | * | 3/2022 | |
| WO | WO-2022059827 | A1 | * | 3/2022 | |

OTHER PUBLICATIONS

H. Schmuck, J. Hehmann, M. Straub and T. Pfeiffer, "Embedded OTDR techniques for cost-efficient fibre monitoring in optical access networks," 2006 European Conference on Optical Communications, Cannes, France, 2006, pp. 1-2, doi: 10.1109/ECOC.2006. 4800887. (Year: 2006).*

Y. Sulin, Y. Jinrong, L. Zebin and W. Weiyang, "SFP-based integrated OTDR for 1:64 TDM-PON testing and diagnose," 2015 Optoelectronics Global Conference (OGC), Shenzhen, China, 2015, pp. 1-3, doi: 10.1109/OGC.2015.7336849. (Year: 2015).*

N. Parkin, M. Bartur, D. Nesset and D. Jenkins, "Gigabit SFP transceiver with integrated optical time domain reflectometer for ethernet access services," 39th European Conference and Exhibition on Optical Communication (ECOC 2013), London, 2013, pp. 1-3, doi: 10.1049/cp.2013.1326. (Year: 2013).*

* cited by examiner

FROM PORT 122

TO PORT 124

2x2 COUPLER 20.1

PLUGGABLE OPTICAL TIME DOMAIN REFLECTOMETER

TECHNICAL FIELD

Disclosed herein are various physical configurations of an optical time domain reflectometer (OTDR) that enable the OTDR to be provided as a pluggable module, such as in a small form factor pluggable (SFP) form.

BACKGROUND

OTDRs are used extensively to determine optical fiber characteristics such as attenuation, reflections, and the like, in order to optimize the working levels of associated transmitter and receiver equipment. An OTDR module typically includes an optical source used to generate a probe lightwave that is coupled into an optical fiber span being analyzed, and an optical receiver for detecting reflected light attributed to the probe lightwave that re-enters the OTDR from the fiber span under evaluation. An associated processing module utilizes information associated with the probe lightwave (e.g., in the case of using probe pulses, the timing information associated with the pulse train) and the optical power in the return back-reflected light to create an output (typically referred to as an OTDR trace) that defines the overall loss along the fiber span, as well as an identification of any physical changes/reflection points (e.g., connectors, splices, and the like) that may be present along the measured span.

While extremely useful in both installation and monitoring of optical fiber links between network nodes, a conventional OTDR requires optics and electronics that cannot simply and/or inexpensively be housed within a pluggable module, as in common use today for various optical components (such as a small form factor optical transceiver). Thus, the OTDR functionality is typically embedded within more complex modules. This integrated approach to providing OTDR functionality limits the flexibility of its use, as well as increasing the cost and size of the larger module component.

SUMMARY OF THE DISCLOSURE

A pluggable OTDR is proposed that is based on a specific architecture that enables the passive optical elements to be separately packaged from the remaining active optical and electrical elements. In this way, the set of active elements (i.e., laser, photodetector, and control/processing electronics) can be arranged in a manner similar to an SFP optical transceiver and assembled within a housing that meets these requirements. Meanwhile, the passive optics can be incorporated into a separate optical fiber pigtailed component that is attached between the active OTDR module and fiber span under test.

In some embodiments, the signal analysis performed on the return/reflected beam may be transferred to a separate off-chip element for processing, further reducing the overall size and complexity of the active OTDR module (also referred to at times as the pluggable OTDR component).

An exemplary embodiment formed in accordance with the present disclosure may take the form of an OTDR comprising both an active OTDR module and a passive OTDR module. The active OTDR module includes an optical transmitter for generating an optical probe signal that exits from an output port of the active module, an optical receiver for accepting, at an input port of the active module, incoming reflected portions of the optical probe signal, and electrical process and control circuitry for energizing the optical transmitter and transforming received, reflected lightwaves into data useful in generating OTDR output traces. The passive OTDR module includes at least a directional optical coupling device (e.g., an optical circulator) coupled to both the input and output ports of the active OTDR module. The passive OTDR module is configured to direct the propagation of the optical probe signal from the output port (of the active module) toward an optical fiber span under test and direct reflections attributed to the optical probe signal from the optical fiber into the input port of the active module.

Other and further aspects of embodiments related to the disclosed pluggable OTDR will become apparent during the course of the following discussion and by reference to the accompanying drawings.

BRIEF DESCRIPTION OF THE DRAWINGS

Referring now to the drawings, where like numerals may reference like parts in several views:

FIG. 6 illustrates a second embodiment of the disclosed pluggable OTDR, utilizing a smaller-sized active OTDR module by re-locating processing electronics (associated with generating the actual OTDR traces) to a separate host card.

DETAILED DESCRIPTION

Figure 1:
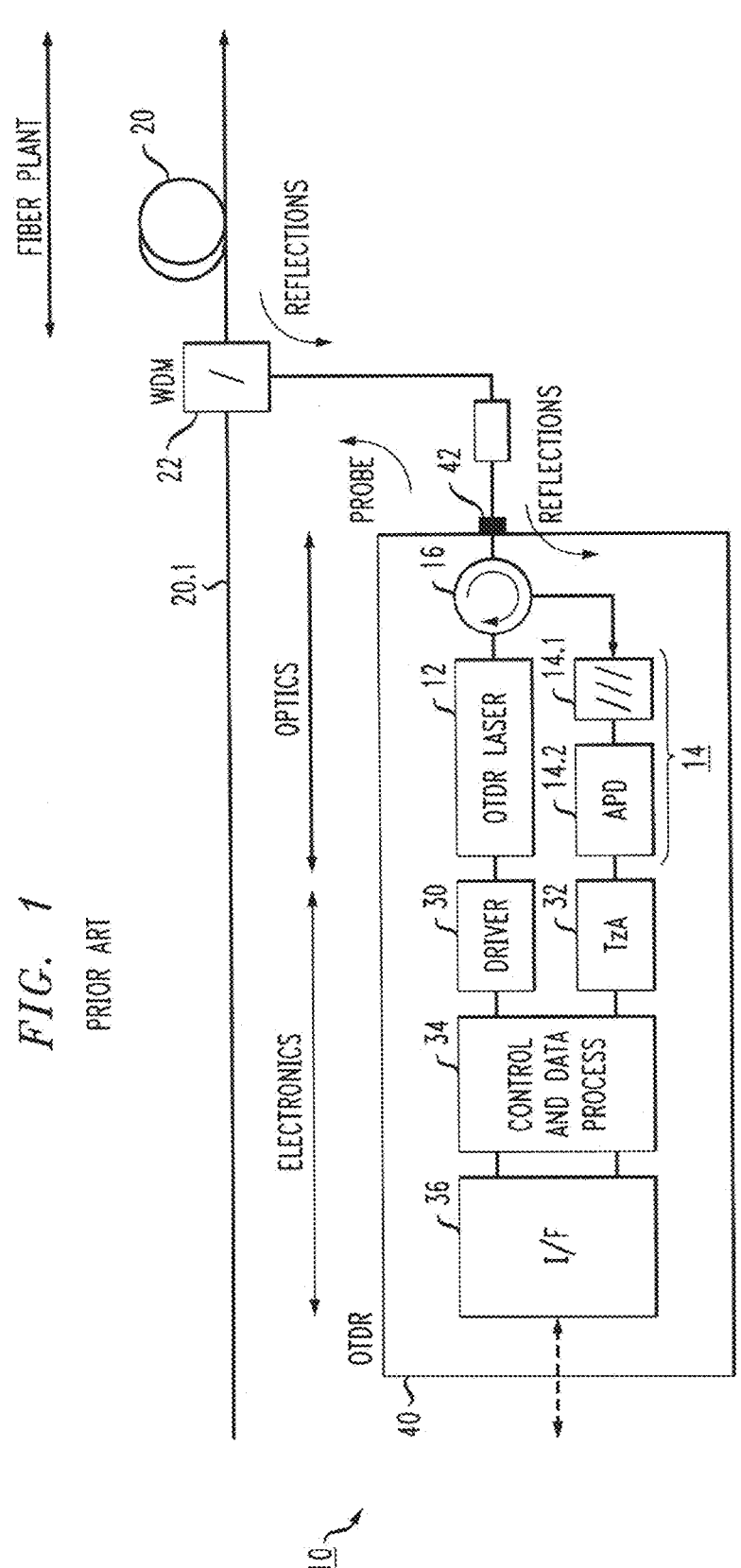
FIG. 1 is a diagram of a conventional prior art OTDR.

FIG. 1 is a prior art diagram of a conventional OTDR 10 that may be used to monitor properties of an optical fiber span 20. OTDR 10 includes an optical transmitter 12 for providing an optical probe lightwave that is coupled into fiber link 20 and used in a manner well-understood in the art to create back-reflected light in the return direction, where the reflected light is used to generate an OTDR trace as the output from OTDR 10. In many cases, the optical probe takes the form of an optical pulse train, but other types of optical probe signals (e.g., continuous-wave signal, a digital signal having a particular coding scheme, etc.) may be used as well.

An optical receiver 14 (in this case taking the form of a bandpass optical filter 14.1 followed by a photodetector 14.2) is also located in OTDR 10 and is used to measure the back-reflected light created by the optical probe as it propagates along fiber link 20. In this particular configuration, an optical circulator 16 is used to control/direct the signal flows between optical transmitter 12, optical receiver 14, and fiber span 20. Various other passive arrangements may be used in place of an optical circulator to control the directions of the propagating signals without affecting the inventive techniques as described below.

OTDR 10 also includes electronic elements used to control the operation of transmitter 12 and receiver 14, as well as process the return light from receiver 14 to develop the OTDR trace output. In particular, a driver circuit 30 is used to energize the light source (laser) within transmitter 12, and may be configured to provide a pulsed electronic input to the light source. A transimpedance amplifier (TIA) 32 is shown as coupled to the output from photodetector 14.2 and is used to convert the electrical current from photodetector 14.2 into a voltage waveform useful in further processing. A processor element 34 is used to control operation of laser driver 30 and also analyze the return electrical signals from TIA 32 used to create the OTDR trace. An electrical interface 36 provides bidirectional communication between OTDR 10 and remote monitoring equipment.

The prior art configuration of OTDR 10 is relatively compact and fully integrated, with all components assembled within a single module 40. A single output port 42 from module 40 provides the optical connection between OTDR 10 and a wavelength division multiplexer (WDM) 22 positioned along fiber span 20. While integration of components is typically a preferred mechanism to achieve improved product designs, in this case the integration reduces the flexibility of the OTDR functionality and results in a product that cannot easily be provided as a pluggable, small form factor component.

Figure 2:
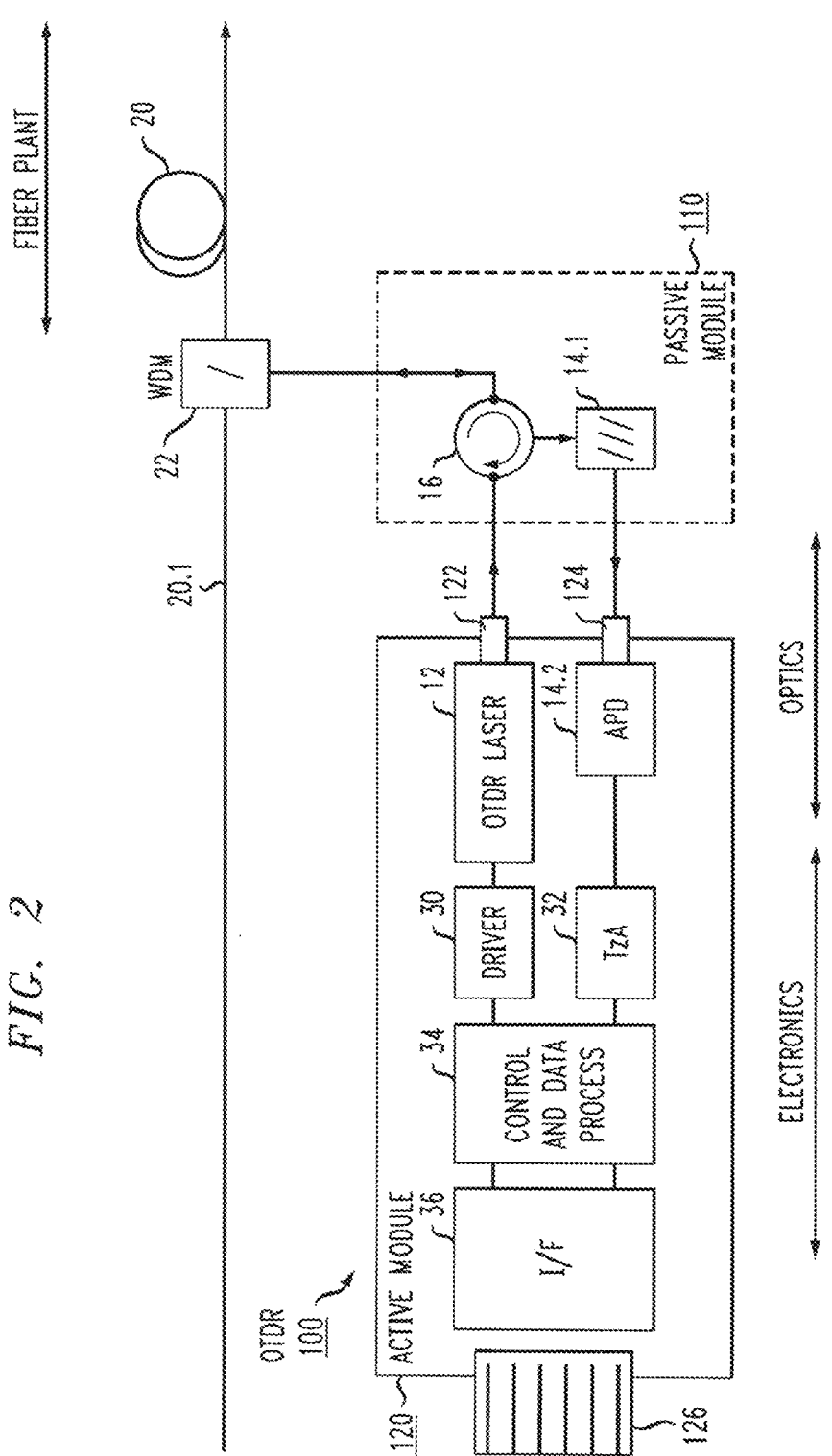
FIG. 2 is a diagram of a first embodiment of a pluggable OTDR formed in accordance with the present disclosure.

FIG. 2 illustrates a first embodiment of the disclosed pluggable OTDR. In accordance with this embodiment, a pluggable OTDR 100 is configured so that the passive optical components (i.e., circulator 16 and bandpass filter 14.1) are separated from the remaining components and perhaps housed together as a passive OTDR module 110. An active OTDR module 120 is shown as housing the remaining components; that is, electro-optic elements including laser 12 and photodetector 14.1, as well as electrical components such as laser driver circuit 30, transimpedance amplifier 32, processor element 34, and interface 36.

A pair of optical ports is included with active module 120, shown as an output port 122 coupled to laser 12 and an input port 124 coupled to photodetector 14.2. The appearance and use of such a dual-port module is common to various SFP optical transceiver designs and enhances the capability to configure OTDR 100 as a pluggable arrangement. An electrical interface connection 126 may take the form of a standard connector used with pluggable optical components.

Figures 3, 4:
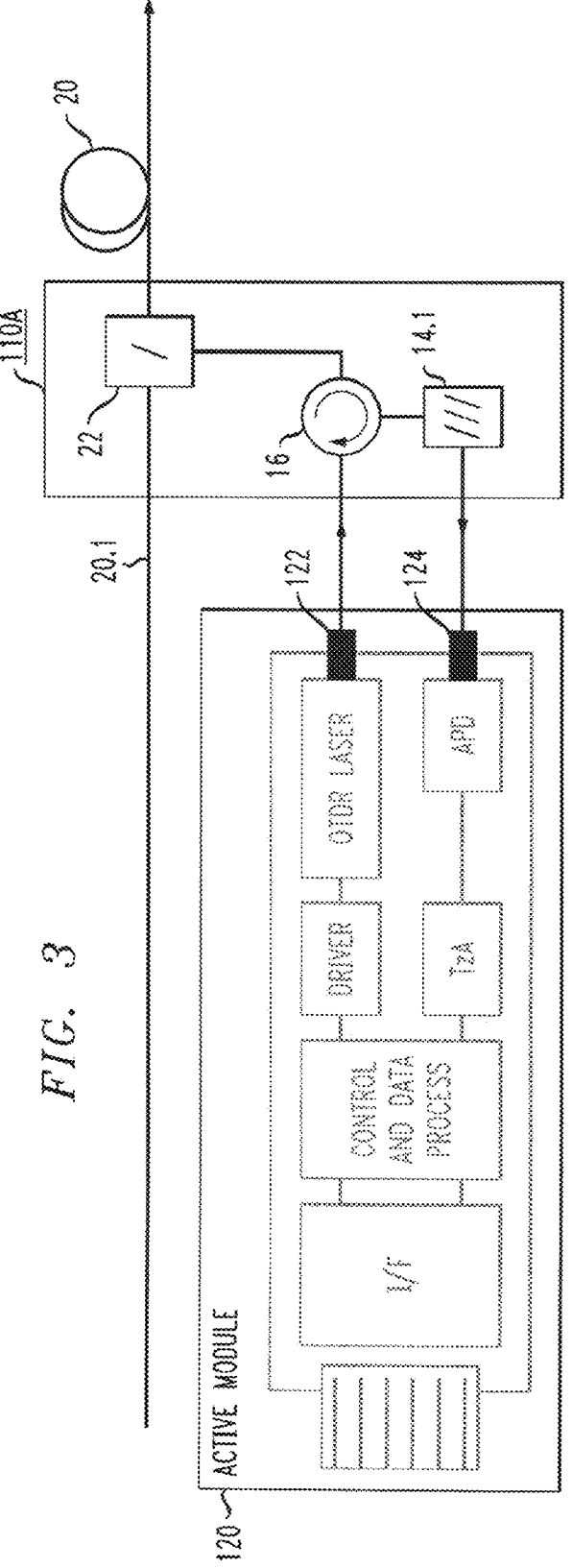
FIG. 3 illustrates an alternative embodiment of a passive OTDR module that may form part of a pluggable OTDR in accordance with the present disclosure.
FIG. 4 shows the passive OTDR module of FIG. 3 embodied as a 2×2 fiber coupler.

FIG. 3 depicts an alternative configuration for passive module 110 of the disclosed pluggable OTDR. In this case, a passive module 110A is formed to also include WDM 22, which is also a passive component. The integration of these three passive elements (i.e., filter 14.1, circulator 16, and multiplexer 22) on a single platform/substrate is considered to simplify the implementation of the disclosed pluggable OTDR. Indeed, passive module 110A may exhibit a 2×2 fiber pigtail configuration, as shown in FIG. 4, where the pair of inputs include a section of fiber 20.1 at the input to multiplexer 22 and the probe beam input from laser 12 (via port 122), and the pair of outputs include fiber span 20 and the probe reflections that enter port 124. In use, OTDR active module 120 (shown in phantom in FIG. 3) may simply be "plugged" into fiber pigtail 110A. When not in use, the optical signal propagating along fiber section 20.1 will simply pass through WDM 22 and continue along fiber span 20.

Figure 5:
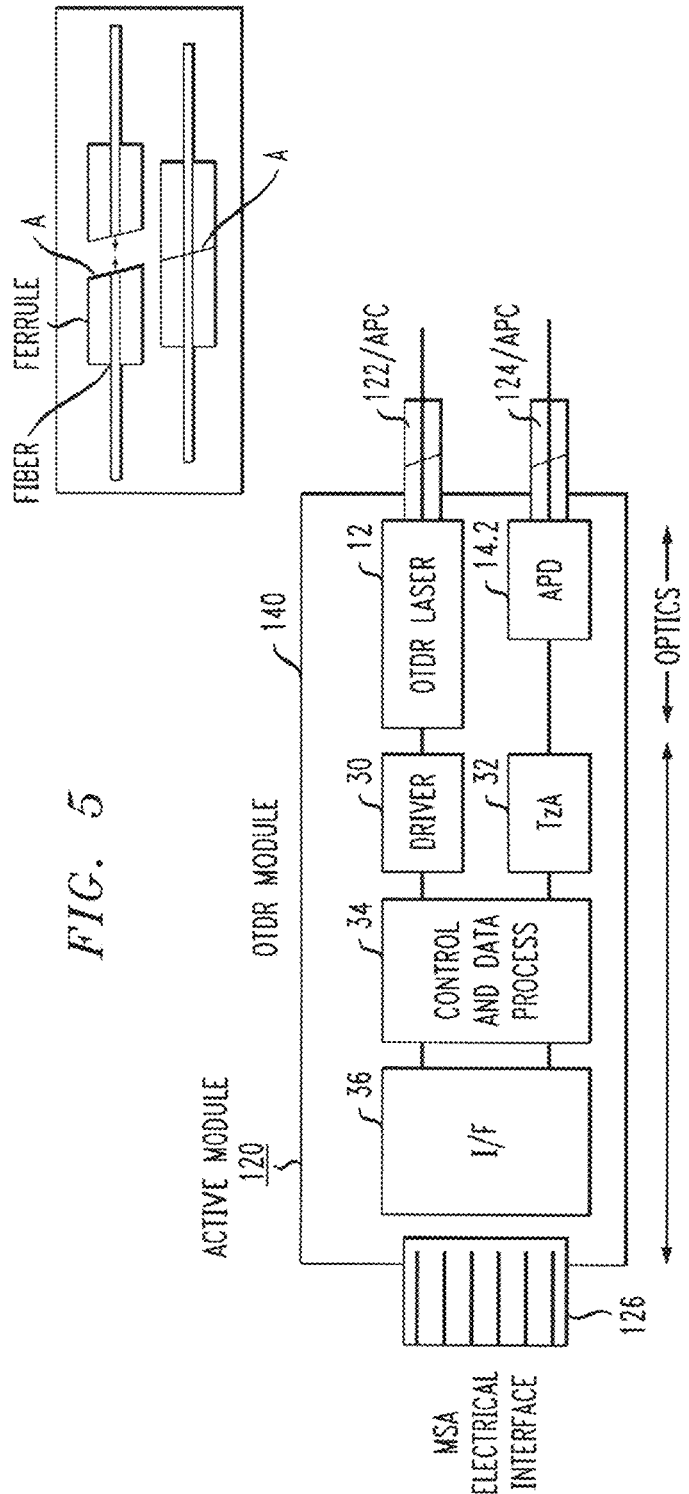
FIG. 5 depicts a particular configuration of the active OTDR module of FIG. 2, in this case using angled physical connectors (APCs) for the optical ports.

FIG. 5 illustrates a specific configuration of pluggable OTDR 100, where in this case optical ports 122, 124 comprise a pair of "angled physical connectors" (APCs) and denoted as 122/APC, 124/APC. An enlarged view of an exemplary APC is shown in the inset of FIG. 5. While not commonly used in optical communication assemblies, APCs are known to minimize unwanted reflections (associated with the beveled angle A between the fiber endfaces within the connector). For the purposes of this disclosure, the APCs prevent back-reflections from entering laser 12 (on the output path) or fiber span 20 (on the input path).

Figure 6:
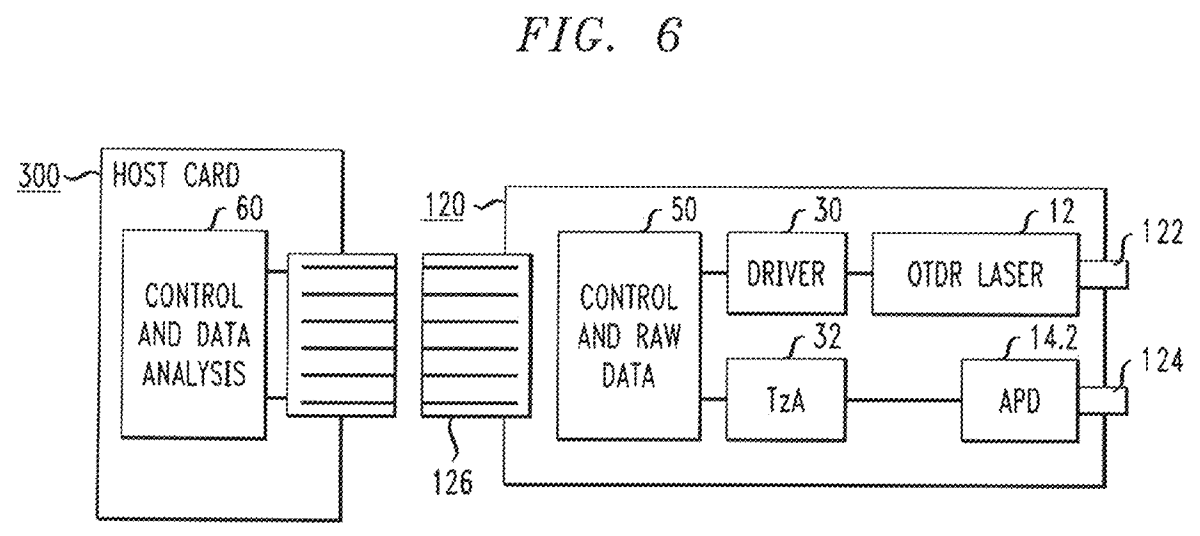

FIG. 6 illustrates a second embodiment of the disclosed pluggable OTDR. In accordance with this embodiment, a smaller-sized pluggable OTDR 200 is provided and further enhances its ability to be used as a pluggable component. The smaller size of OTDR 200 (in comparison to OTDR 100) is a result of moving the data processing functionality used to generate OTDR traces to a remote component, shown here as a host card 300. The term "remote" is used merely to distinguish from the previous embodiment where the processing is performed within the OTDR module itself. Indeed, it is contemplated that small-sized pluggable OTDR 200 will be plugged directly into host card 300 via electrical interconnection 126.

In comparison to the arrangement of FIG. 2, processor element 34 of OTDR 100 is replaced in OTDR 200 by a controller 50, which in this case is used to provide the control input to laser driver circuit 22 (similar to processor 34, above) and receive the "raw data" output from TIA 32 (without performing any further processing on this data). In accordance with this embodiment of the present disclosure, a separate data analysis processor 60 is shown as contained on host card 300 and is used to create the OTDR traces from the provided input data. In most cases, data processor 60 is electrically connected to controller 50 via electrical interface connection 126.

Summarizing, a pluggable OTDR as formed in accordance with the present disclosure is considered to provide the same functionality as a standard OTDR, but with a reduced component count. A transmitter optical subassembly (TOSA) and receiver optical subassembly (ROSA) may be used in combination with the necessary electronics to create a small-sized active ODTR module that includes the dual optical port configuration used in many pluggable optical components. A separate module integrating the passive optical elements simplifies the connections between the fiber span and the active OTDR module.

Although the disclosed principles have been illustrated and described herein with reference to certain preferred embodiments and specific examples thereof, it will be readily apparent to those of ordinary skill in the art that other embodiments and examples may perform similar functions and/or achieve like results. All such equivalent embodiments and examples are within the spirit and scope of this disclosure, are contemplated thereby, and are intended to be covered by the claims appended hereto.

What is claimed is:

1. An optical time domain reflectometer (OTDR) comprising:

an active OTDR module in a form of a small form-factor pluggable (SFP) component that houses an electrical interface connection, an optical input port, an optical output port, a laser source, a laser driver circuit, a photodetector, a transimpedance amplifier, and electrical process and control circuitry; and a separate pigtailed component coupled between a fiber span under test and the input and output optical ports of the active OTDR module;

wherein the laser source provides, in an OTDR measurement process, an optical probe signal to the fiber span under test via the optical output port of the SFP component;

wherein the laser driver circuit supplies an electronic input causing the laser source to generate the optical probe signal;

wherein the photodetector is disposed to receive reflected portions of the optical probe signal from the fiber span under test via the input optical port of the SFP component, and generate therefrom an electrical photocurrent representation of the reflected portions of the optical probe signal;

wherein the transimpedance amplifier is coupled to an output of the photodetector to receive the electrical photocurrent and converts the electrical photocurrent into an electrical voltage representation of the reflected portions of the optical probe signal;

wherein the electrical process and control circuitry energizes the laser driver circuit and transforms the electrical voltage representation of the reflected portions of the optical probe signal output from the transimpedance amplifier into data useful in generating OTDR output traces; and wherein the separate pigtailed component houses a directional optical coupling device coupled to both the optical output port and the optical input port of the active OTDR module and configured to direct propagation of the optical probe signal from the optical output port toward the fiber span under test and direct reflections attributed to the optical probe signal from the fiber span under test into the optical input port of the active OTDR module.

2. The OTDR of claim 1 wherein the separate pigtailed component comprises a bandpass filter disposed between the directional optical coupling device and the optical input port of the SFP component.

3. The OTDR of claim 1 wherein the directional optical coupling device comprises an optical circulator.

4. The OTDR of claim 1 wherein the optical input port and the optical output port of the active OTDR module comprise angled physical connectors (APCs).

5. The OTDR of claim 1 wherein the electrical interface connection permits plugging the active OTDR module into another electrical component.

6. The OTDR of claim 1 wherein the electrical process and control circuitry further comprises an electrical interface component that provides bidirectional communication between the active OTDR module and external monitoring components.

7. The OTDR of claim 6 wherein the electrical process and control circuitry further comprises processing circuitry that controls operation of the laser driver circuit, analyzes the electrical voltage output from the transimpedance amplifier, and generates therefrom an OTDR trace as an output.

8. The OTDR of claim 6 wherein the electrical interface connection is coupled to the electrical interface component.

9. An optical time domain reflectometer (OTDR) system, comprising:

an OTDR small form factor pluggable (SFP) component housing:

an electrical interface connection that permits plugging the OTDR SFP component into another electrical component;

a first angled physical connector configured to provide an optical probe signal to a fiber span under test;

a second angled physical connector configured to receive reflected portions of the optical probe signal from the fiber span under test;

a laser source that provides, in an OTDR measurement process, the optical probe signal to the fiber span under test via the first angled physical connector;

a photodetector disposed to receive the reflected portions of the optical probe signal from the fiber span under test via the second angled physical connector and generate therefrom an electrical photocurrent representation of the reflected portions of the optical probe signal; and electrical circuitry that receives the electrical photocurrent and generates an electrical data signal representative of the reflected portions of the optical probe signal; and a pigtailed component coupled between the first and second angled physical connectors and the fiber span under test;

wherein the pigtailed component houses a directional optical coupling device coupled to both the first and second angled physical connectors and configured to direct propagation of the optical probe signal from the first angled physical connector toward the fiber span under test and direct reflections attributed to the optical probe signal from the fiber span under test into the second angled physical connector; and wherein the pigtailed component comprises a bandpass filter disposed between the directional optical coupling device and the second angled physical connector.

10. The OTDR system of claim 9, wherein the directional optical coupling device comprises an optical circulator.

11. The OTDR system of claim 9, wherein the electrical circuitry comprises an electrical interface component that provides bidirectional communication between the electrical circuitry and external monitoring components.

12. The OTDR system of claim 11, wherein the electrical interface connection is coupled to the electrical interface component.

13. The OTDR system of claim 9, wherein:

the pigtailed component comprises a wavelength division multiplexer between a fiber span and the fiber span under test; and the wavelength division multiplexer directs propagation of the optical probe signal of the first angled physical connector toward the fiber span under test and directs reflections attributed to the optical probe signal into the second angled physical connector.

14. The OTDR system of claim 13, wherein the wavelength division multiplexer permits an optical signal to pass through and propagate between the fiber span and the fiber span under test when the OTDR SFP component is not in use.

15. An optical time domain reflectometer (OTDR) system, comprising:

an OTDR small form factor pluggable (SFP) component housing:

an electrical interface connection that permits plugging the OTDR SFP component into another electrical component;

a first angled physical connector configured to provide an optical probe signal to a fiber span under test;

a second angled physical connector configured to receive reflected portions of the optical probe signal from the fiber span under test;

a laser source that provides, in an OTDR measurement process, the optical probe signal to the fiber span under test via the first angled physical connector;

a photodetector disposed to receive the reflected portions of the optical probe signal from the fiber span under test via the second angled physical connector and generate therefrom an electrical photocurrent representation of the reflected portions of the optical probe signal; and electrical circuitry that receives the electrical photocurrent and generates an electrical data signal representative of the reflected portions of the optical probe signal; and a pigtailed component coupled between the first and second angled physical connectors and the fiber span under test;

wherein the pigtailed component houses a directional optical coupling device coupled to both the first and second angled physical connectors and configured to direct propagation of the optical probe signal from the first angled physical connector toward the fiber span under test and direct reflections attributed to the optical probe signal from the fiber span under test into the second angled physical connector; and wherein the pigtailed component comprises a wavelength division multiplexer between a fiber span and the fiber span under test.

16. The OTDR system of claim 15, wherein the directional optical coupling device comprises an optical circulator.

17. The OTDR system of claim 15, wherein:

the electrical circuitry comprises an electrical interface component that provides bidirectional communication between the electrical circuitry and external monitoring components; and the electrical interface connection is coupled to the electrical interface component.

18. The OTDR system of claim 15, wherein the wavelength division multiplexer directs propagation of the optical probe signal of the first angled physical connector toward the fiber span under test and directs reflections attributed to the optical probe signal into the second angled physical connector.

19. The OTDR system of claim 18, wherein the wavelength division multiplexer permits an optical signal to pass through and propagate between the fiber span and the fiber span under test when the OTDR SFP component is not in use.

20. The OTDR system of claim 18, wherein the wavelength division multiplexer permits an optical signal to pass through and propagate between the fiber span and the fiber span under test when the first and second angled physical connectors of the OTDR SFP component are not coupled to the pigtailed component.

* * * * *